United States Patent
Wegman et al.

(10) Patent No.: US 7,601,914 B2
(45) Date of Patent: Oct. 13, 2009

(54) SEAL FOR CABLE SPLICE CLOSURES

(75) Inventors: John Wayne Wegman, Largo, FL (US); Thomas Evans, Cordova, TN (US)

(73) Assignee: Thoms & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/801,047

(22) Filed: May 8, 2007

(65) Prior Publication Data
US 2007/0261876 A1    Nov. 15, 2007

Related U.S. Application Data

(60) Provisional application No. 60/799,300, filed on May 10, 2006.

(51) Int. Cl.
*H02G 15/08* (2006.01)
(52) U.S. Cl. .......................................................... 174/93
(58) Field of Classification Search .................... 174/93, 174/74 A
See application file for complete search history.

(56) References Cited

U.S. PATENT DOCUMENTS

| | | | | |
|---|---|---|---|---|
| 2,937,228 A | * | 5/1960 | Robinson | ................... 174/88 C |
| 3,781,458 A | * | 12/1973 | May | .......................... 174/84 C |
| 4,358,634 A | | 11/1982 | Dienes | |
| 4,484,962 A | | 11/1984 | Dienes et al. | |
| 4,666,537 A | | 5/1987 | Dienes | |
| 4,685,981 A | | 8/1987 | Dienes | |
| 4,732,628 A | | 3/1988 | Dienes | |
| 6,806,417 B2 | * | 10/2004 | Murakami et al. | ............ 174/36 |
| 2004/0050575 A1 | * | 3/2004 | Hershkowitz | ................ 174/76 |

FOREIGN PATENT DOCUMENTS

EP          886 357        * 12/1998

OTHER PUBLICATIONS

Web Page Translation, http://babelfish.yahoo.com/translate_txt, Jan. 22, 2009.*

* cited by examiner

*Primary Examiner*—Chau N Nguyen
(74) *Attorney, Agent, or Firm*—Hoffmann & Baron, LLP

(57) ABSTRACT

The present invention provides a splice closure for covering an elongate cable splice including a splice cover sheet having opposed longitudinal ends. The sheet is wrapped about the cable splice with the ends being overlapped. A sealant strip is positioned to overlie the cable splice and the one end of the cover sheet.

11 Claims, 2 Drawing Sheets

SEAL FOR CABLE SPLICE CLOSURES

CROSS-REFERENCE TO RELATED APPLICATION

This application claims priority to U.S. patent application Ser. No. 60/799,300, filed on May 10, 2006, which is incorporated herein by reference.

FIELD OF THE INVENTION

The present invention relates generally to a protective cover for enclosing an electrical cable splice. More particularly, the present invention relates to a sealing strip which further seals the enclosure.

BACKGROUND OF THE INVENTION

Cables containing many small diameter wires are often used in telecommunications and data communication systems that may be installed underground or overhead in outdoor environments. Often, for repair and maintenance purposes, it is necessary to breach the integrity of the outer jacket overlying and protecting the wires and form a cable splice. After effecting such repairs and maintenance, it is necessary to cover the splice and reestablish the integrity of the cable jacket.

One technique for covering a cable splice includes applying an enclosure over the cable splice. One particularly effective enclosure is of the type sold by the assignee herein under the registered trademark KOLD-N-KLOSE. Splice closures of this type are more fully shown in U.S. Pat. Nos. 4,358,634; 4,484,962; 4,666,537; 4,685,981 and 4,732,628, each of these patents being incorporated by reference herein for all purposes.

The cable splice enclosure described above is formed by employing a split unitary cover having sealant material on one side. The split unitary cover is wrapped around the cable splice with the sealant facing the splice. The cover has overlapping ends to effectively seal the splice within the closure.

In certain situations, such as where the cable splice is used in extreme temperature conditions, the overlapped ends of the cable splice may have a tendency to come apart. In these situations, this could violate the integrity of the splice closure.

It is, therefore, desirable to provide a technique for sealing the longitudinal overlapped edges of the cable splice closure maintaining the integrity of the enclosure in extreme temperature conditions.

SUMMARY OF THE INVENTION

A splice closure for covering an elongate cable splice includes a splice cover sheet having opposed longitudinal ends. The sheet is wrapped about the cable splice with the ends being overlapped. A sealant strip is positioned to overlie the cable splice and the one end of the cover sheet.

In a method aspect of the present invention, a method of enclosing a cable splice is provided. The method includes providing a splice cover sheet having opposed longitudinal ends. One end of the sheet is placed along the cable splice. A sealant strip is positioned along the one end of the sheet and the cable splice. The cover is wrapped around the splice so that the other end of the sheet extending over and beyond the one end of the sheet and the sealant strip.

DETAILED DESCRIPTION OF THE PREFERRED EMBODIMENTS

The present invention provides an enclosure for a cable splice and a method for enclosing the splice.

As used herein, a cable splice includes a portion of a telecommunication/data cable having a plurality of insulative conductors covered by an outer insulative jacket. For purposes of repair or maintenance or to make interconnectors of splices, a portion of the jacket is removed exposing the conductors. As the cable may be exposed to adverse outdoor conditions, the integrity of the jacket must be reestablished. This is typically done by providing a protective covering over the exposed area of the cable.

One technique commonly used is to form a pouch about the exposed area of the cable and cover the exposed area with an encapsulant material which is poured into the pouch. The pouch may be closed and the encapsulant material gels or hardens to provide an effective environmental barrier. The encapsulated portion of the cable is commonly referred to as an encapsulated cable splice or cable splice. The cable splice may be further covered by a cable splice closure for additional protection.

The present invention provides an improved technique for enclosing the cable splice.

Figure 1:
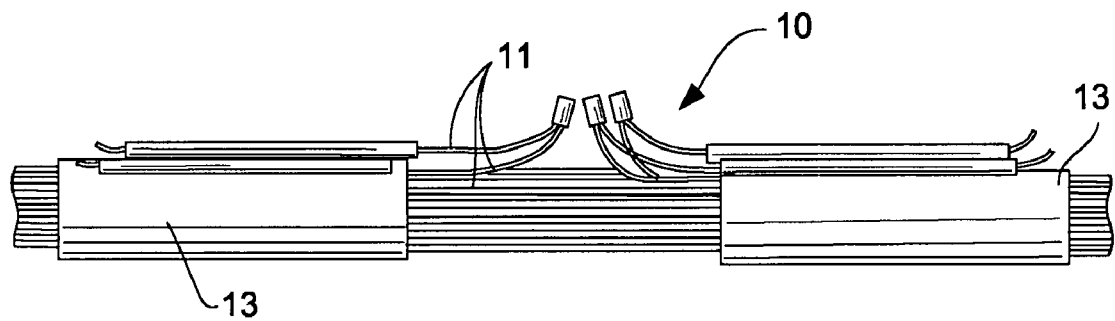
FIG. 1 is a plan view of a cable splice.

Referring to FIG. 1, a cable splice 10 is shown. Cable splice 10 may include insulative conductors 11 within an outer jacket 13 which has been stripped partially away. An encapsulant (not shown) would cover the exposed conductors. A cable splice of the type referred to herein is shown and disclosed more fully in the above-incorporated references.

Figure 2:
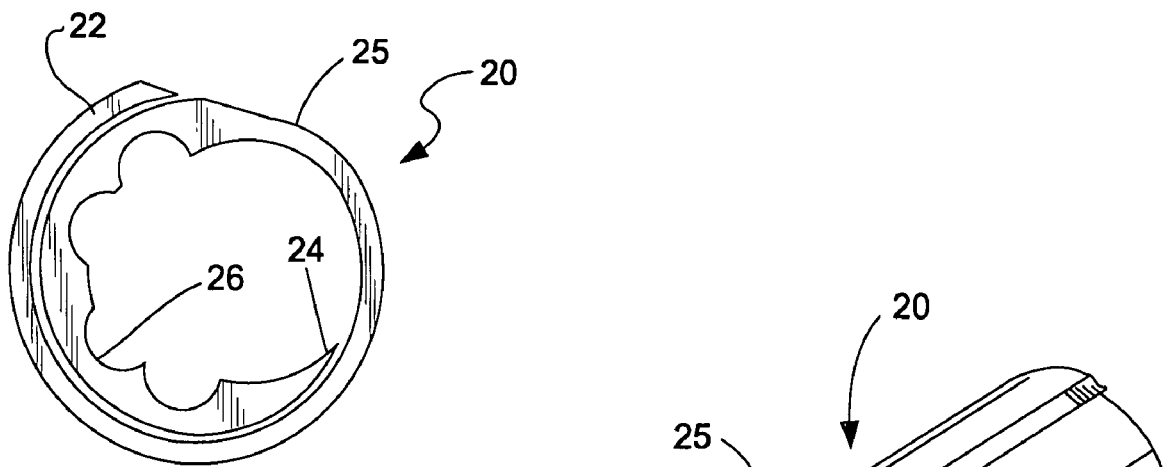
FIG. 2 shows an end view of a cable splice cover sheet which may be employed in accordance with the present invention.
Figure 3:
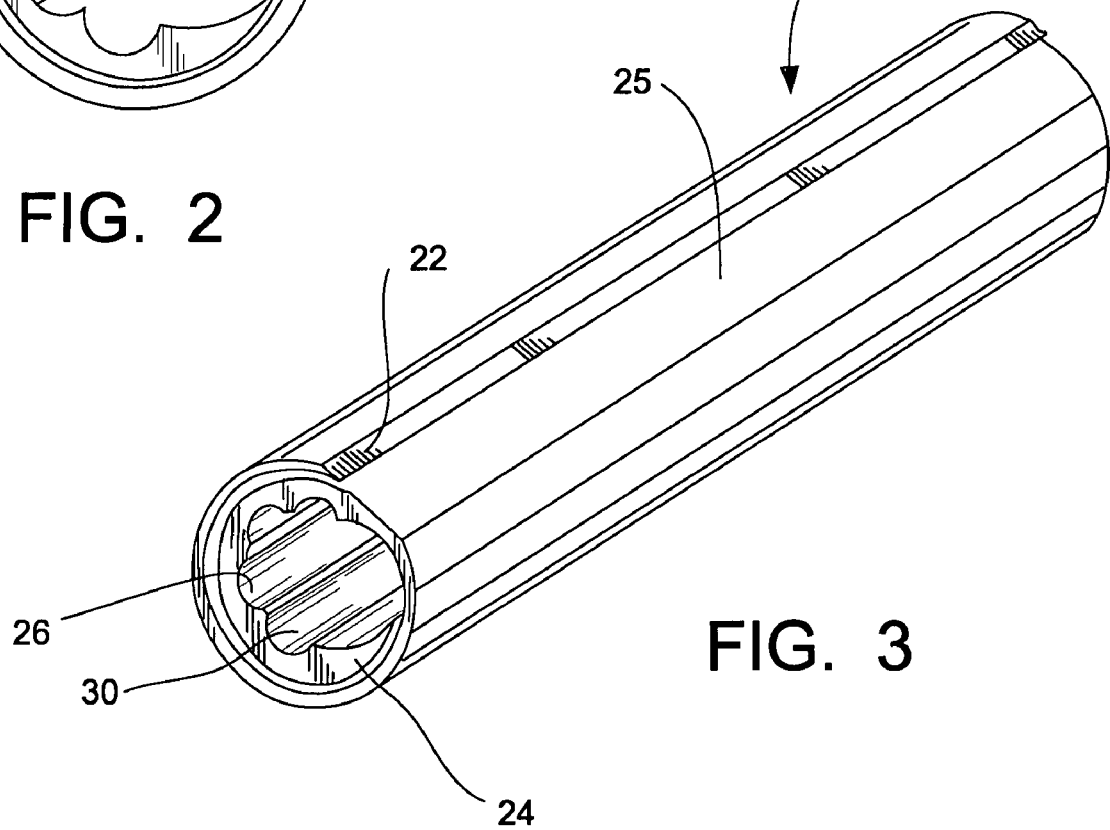
FIG. 3 shows a perspective view of the cover sheet of FIG. 2.

Referring to FIGS. 2 and 3, a cable splice cover 20 is placed over cable splice 10. Cover 20 includes a generally cylindrical elongate tubular member made of flexible, rubber-like electrically insulative material. Preferably, the cover may be formed from neoprene although other resilient nonconductive elastomeric materials may also be used. The cylindrical cover is formed from a sheet and wrapped into a tubular configuration so that opposed ends 22 and 24 thereof overlap.

The cover 20 has opposed planar surfaces 25 and 26. The inner surface 26 of cover 20 is coated with a sealing material 30 (FIG. 3) such as uncured butyl sealant capable of adhering to itself and to other materials. A sheet of readily removable release paper (not shown) may be applied over the sealant material 30 to protect the coated surface and facilitate handling and storage. The cover shown herein and its application to a cable splice is also more fully described in the above referenced incorporated patents.

As the sealing material 30 is designed to not only adhere the cover to the cable splice, but also to adhere the ends of the cover over one another, an effective sealed enclosure is formed about the cable splice. However, in certain limited situations where temperature extremes are prevalent, especially colder temperatures, it has been found that the overlapped ends 22 and 24 of cover 20 may have a tendency to open up.

Figure 4:
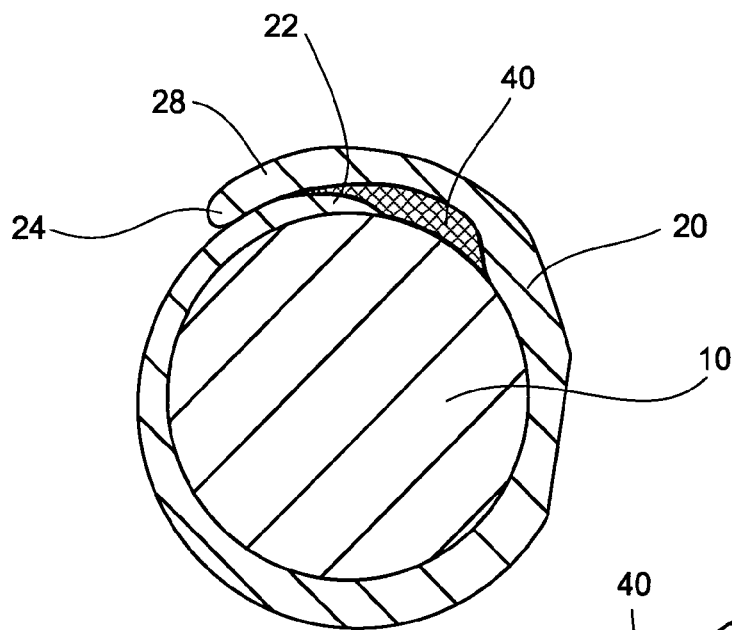
FIG. 4 is a schematic cross-section of a cover placed over a cable splice using a sealant strip in accordance with the present invention.

Referring to FIG. 4, a strip 40 of sealing material may be employed to secure the ends 22 and 24 of cover 20 to the cable splice 10. Strip 40 is an elongate tape like strip of sealing material which is a mastic of the type sold by assignee herein under the trademark TBT20.

As shown in FIG. 4 in one embodiment, sealing strip 40 may be placed along one end 22 of cover sheet 20 along the length thereof so as to overlie the end and the splice closure. The strip 40 thereby further secures the one end 22 to the cable splice 10.

Additionally, as the cover sheet 20 is wrapped about the cable splice 10, the other end 24 of cover sheet 20 extends over and beyond strip 40. The extending portion 28 of the cover sheet is adhered to the splice 10 by engagement with the exposed portion of the sealing strip 40. This assures that the cover sheet remains in sealed engagement with cable splice as the sealing strip 40 adheres both end 22 of the cover sheet 20 and the overlying portion 28 to the splice 10.

The embodiment of FIG. 4 is particularly useful where the cable splice 10 is of small enough diameter to be covered by a single cover sheet 20. In certain instances, the cable splice may be of a said diameter that it is not possible to cover the splice with a single cover sheet.

Figure 5:
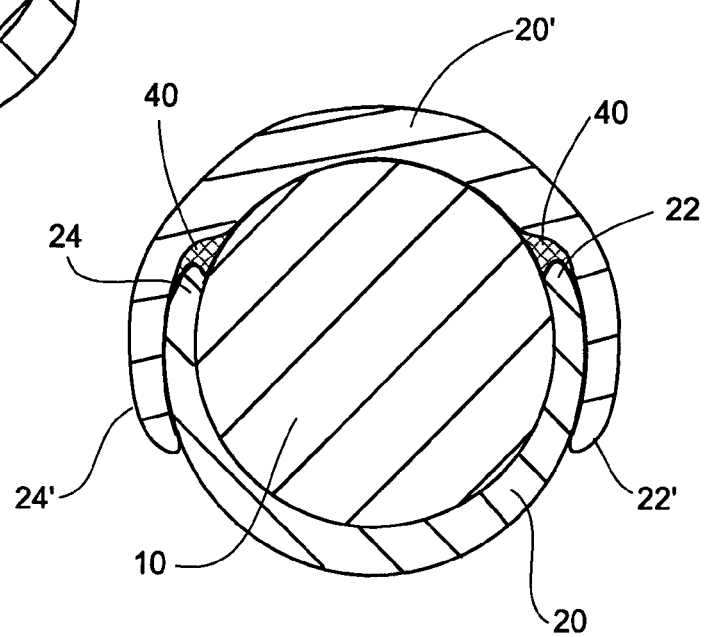
FIG. 5 is a schematic cross-section of a pair of covers placed over a cable splice using a pair of sealant strips of the present invention.

Referring to FIG. 5, a technique for covering a cable splice 10 with a pair of overlying cover sheets 20 and 20' are shown. The first cover sheet 20 is applied about the cable splice 10. The ends 22 and 24 thereof do not overlap. A sealing strip 40 is applied over each end 22 and 24 in a manner similar to that described above. Thereafter, a second cover sheet 20' is positioned over the cable splice. The second cover sheet is similar to the first cover sheet 40 and is applied to that the ends 22' and 24' thereof overlap the respective ends of the first cover sheet 22 and 24. The second cover sheet will be additionally adhered to the splice by overlying engagement with the sealing strip 40. A larger diameter cable splice may also be enclosed in accordance with the present invention.

While the use of one or more longitudinal strips 40 is shown, the present invention contemplates a further technique to apply strip 40.

Figure 6:
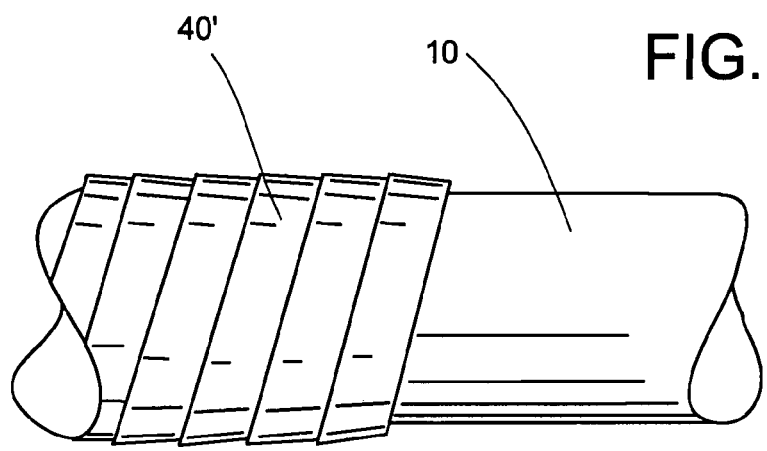
FIG. 6 shows a sealant strip of the present invention being applied to a cable splice in a helically wrapped fashion.

As shown in FIG. 6, the cable splice 10 may be completely covered with a helical wrapping of strip 40'. The helical wrapping is preferably a half lap wrap to effectively cover the splice with the strip 40'. Thereafter the cover or covers are applied to the strip 40' effectively further sealing each cover to the cable splice.

Various changes to the foregoing described and shown structures would now be evident to those skilled in the art. Accordingly, the particularly disclosed scope of the invention is set forth in the following claims.

What is claimed is:

1. An enclosure for covering a cable splice, comprising:
a first cover sheet having an inner surface, outer surface, a first end and a second end for wrapping about said cable splice, said cover is formed from a flexible, rubber-like electrically insulative sheet material;
a first longitudinal sealing strip positionable over said outer surface of said first end of said cover sheet and for overlying said cable splice, said first longitudinal sealing strip is formed of a mastic material, said longitudinal sealing strip having an exposed portion and an unexposed portion, said exposed portion adhering to said cable splice, and said unexposed portion adhering to said outer surface of said first end of said cover sheet, and said unexposed portion adhering to said inner surface of said second end.

2. An enclosure of claim 1 wherein said second end of said first cover sheet overlies and extends beyond said first end and said first sealing strip.

3. An enclosure of claim 1 further including a second sealing strip overlying the second end of said first cover sheet and said cable splice.

4. An enclosure of claim 3 further including a second cover sheet for wrapping about said cable splice and overlying said ends of said first cover sheet and said first and second sealing strips.

5. An enclosure for covering a cable splice of claim 1, further including a helical wrap of a longitudinal sealant strip about said splice, said strip adhering to said splice.

6. An enclosure of claim 5 wherein said helical wrap is a half wrap to cover said splice with said sealant strip.

7. An enclosure of claim 1 wherein said first cover sheet is formed from neoprene.

8. A method of enclosing a cable splice comprising the steps of:
providing a first cover sheet having an outer surface, inner surface, a first end and a second end;
placing the first end of said first cover sheet along said cable splice;
placing a first sealing strip along said outer surface of said first end of cover sheet and said cable splice;
wrapping said inner surface of said first cover sheet about said cable splice; and
adhering said first sealing strip to said cable splice.

9. A method of claim 8 wherein said wrapping step includes placing said second end of said first cover sheet over said first sealing strip.

10. A method of claim 8 further including the step of:
placing a second sealing strip over said second end of said first cover and said cable splice; and
wrapping a second cover sheet about said cable splice to overlie both of said first end and second end of said first cover sheet.

11. An enclosure for covering a cable splice, comprising:
a first cover sheet having a first end opposed a second end for wrapping about said cable splice, said cover is formed from a flexible, rubber-like electrically insulative material;
a second cover sheet having a third end opposed a fourth end for wrapping about said cable splice, said cover is formed from a flexible, rubber-like electrically insulative material, said second cover sheet is positionable over said first cover sheet;
a first longitudinal sealing strip applied to said first end, said first longitudinal sealing strip attachable to said cable splice and said third end; and
a second longitudinal sealing strip applied to said second end, said second longitudinal sealing strip attachable to said cable splice and said fourth end.

\* \* \* \* \*